(12) United States Patent
Foster et al.

(10) Patent No.: US 8,749,240 B1
(45) Date of Patent: Jun. 10, 2014

(54) TIME DOMAIN METHOD AND APPARATUS FOR METAL DETECTORS

(75) Inventors: Eric Foster, Bridport (GB); John L. Earle, Sweet Home, OK (US); Carl W. Moreland, Corvallis, OR (US)

(73) Assignee: White's Electronics, INc., Sweet Home, OR (US)

( * ) Notice: Subject to any disclaimer, the term of this patent is extended or adjusted under 35 U.S.C. 154(b) by 304 days.

(21) Appl. No.: 13/235,950

(22) Filed: Sep. 19, 2011

Related U.S. Application Data

(60) Provisional application No. 61/403,598, filed on Sep. 17, 2010, provisional application No. 61/403,704, filed on Sep. 20, 2010.

(51) Int. Cl.
*G01V 3/10* (2006.01)

(52) U.S. Cl.
USPC ............................................ 324/329; 324/326

(58) Field of Classification Search
USPC ................................................ 324/329, 326
See application file for complete search history.

(56) References Cited

U.S. PATENT DOCUMENTS

2010/0148781 A1* 6/2010 Candy .......................... 324/329

* cited by examiner

*Primary Examiner* — Reena Aurora
(74) *Attorney, Agent, or Firm* — James Creighton Wray

(57) ABSTRACT

This invention provides a pulse induction metal detector where a coil transmits a pulsed magnetic field to energize metal objects that are often buried or hidden in a matrix (ground) containing ferromagnetic minerals. A difficult challenge is to detect and identify the metal object while ignoring the ferromagnetic matrix. Techniques are presented for achieving this.

24 Claims, 4 Drawing Sheets

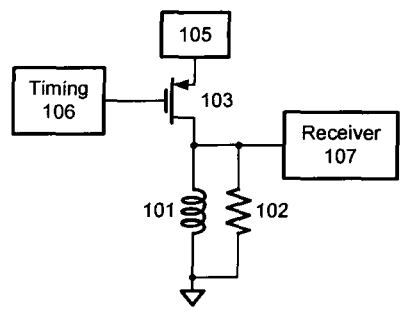
Fig. 1
Prior Art
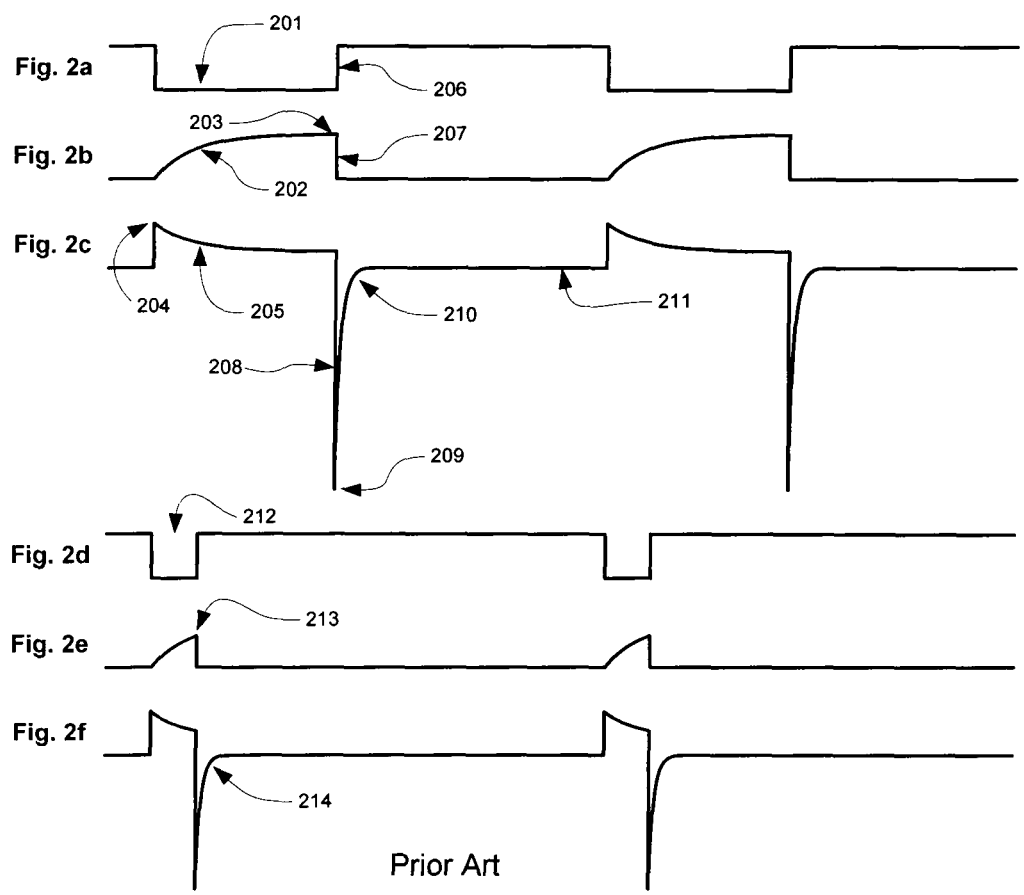
Prior Art

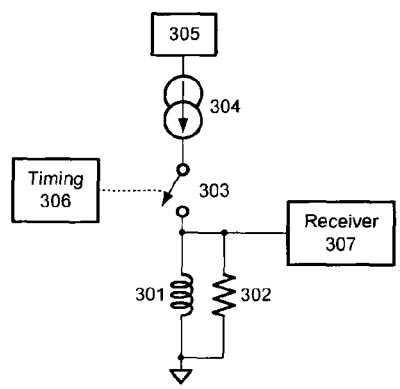
Fig. 3
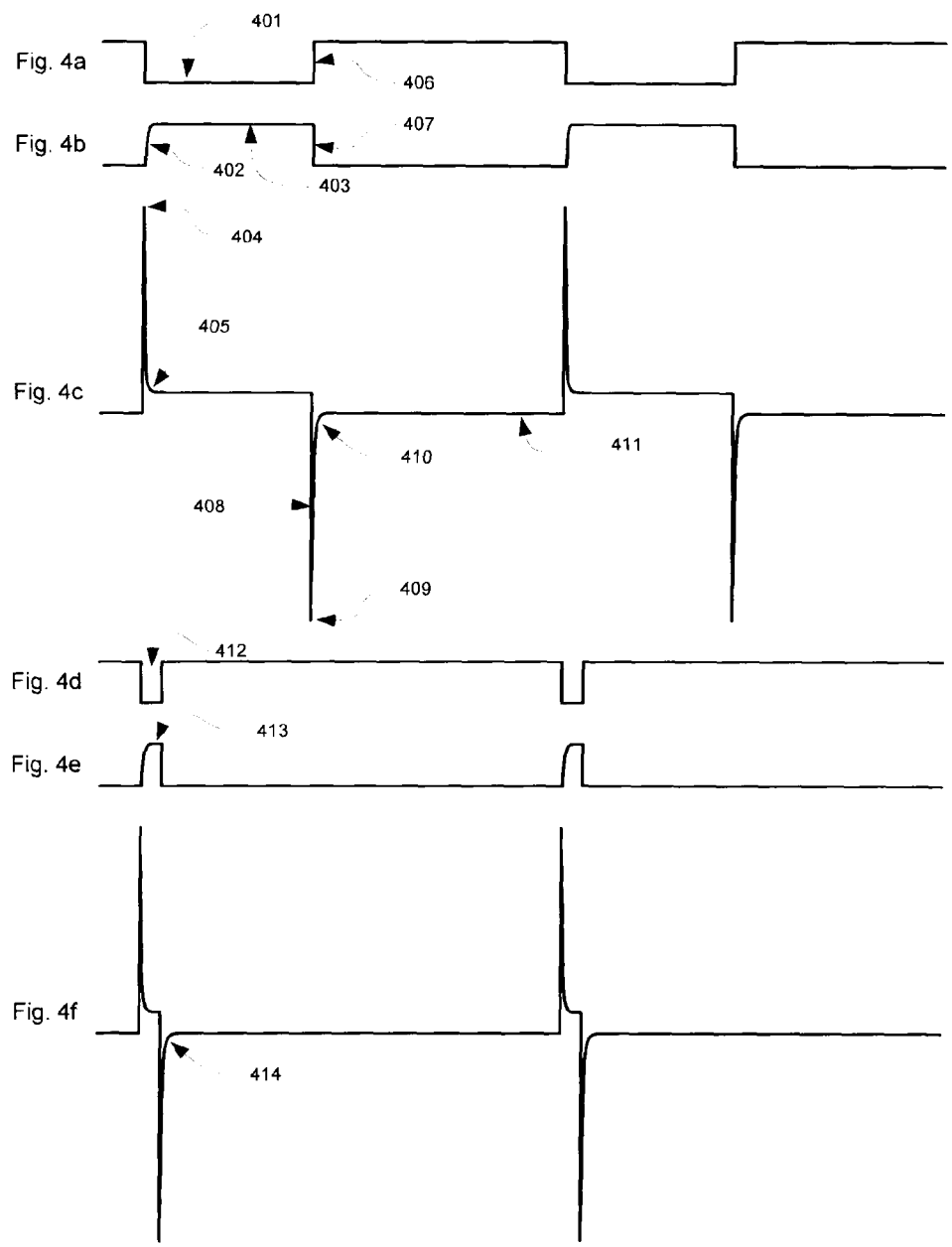

501 502

503   504

601   602

603   604

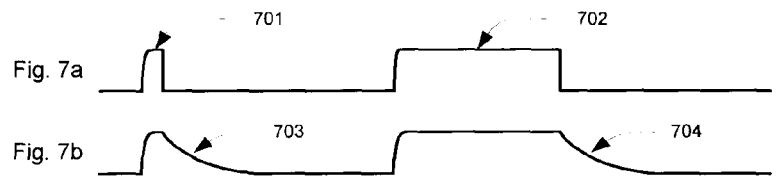
Fig. 7a
Fig. 7b
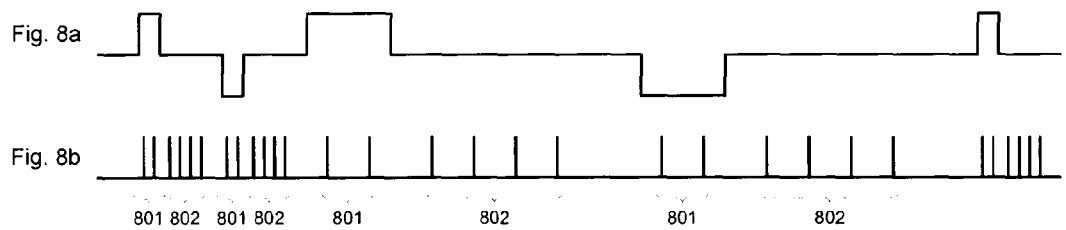
Fig. 8a
Fig. 8b
801 802 801 802 801 802 801 802
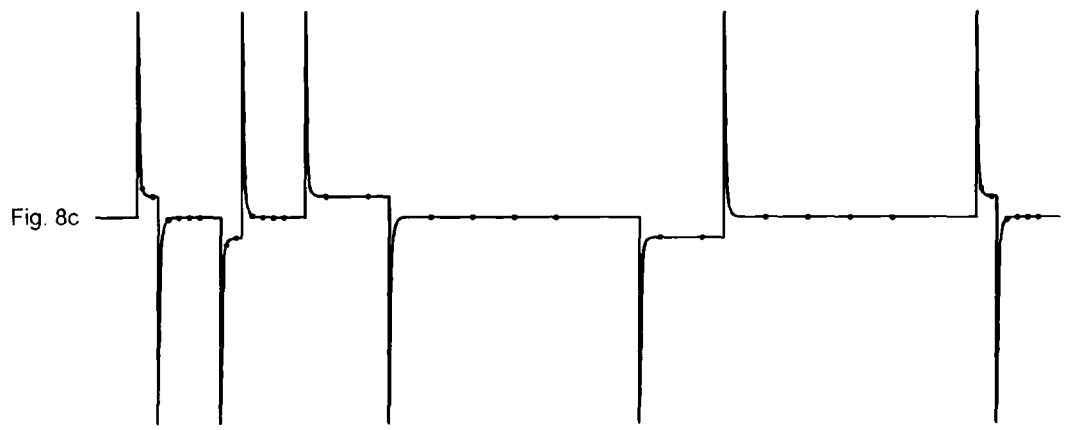
Fig. 8c

TIME DOMAIN METHOD AND APPARATUS FOR METAL DETECTORS

This application claims the benefit of U.S. Provisional Application No. 61/403,598, filed Sep. 17, 2010 and U.S. Provisional Application No. 61/403,704 filed Sep. 20, 2010, which are hereby incorporated by reference in their entirety as if fully set forth herein.

FIELD OF THE INVENTION

This invention provides a metal detector with means to generate time domain transmit signals and for signal processing and analysis methods.

BACKGROUND OF THE INVENTION

Induction metal detectors are generally designed to use either continuous wave signals (so-called frequency domain detectors) or to use pulse or rectangular signals (so-called time domain detectors). In a pulse induction (PI) metal detector, a coil is typically energized using a DC current, then abruptly turned off to rapidly collapse the developed magnetic field. The rapid collapse of the field at the end of each successive pulse results in eddy currents being generated in nearby conductive metallic objects. The eddy currents in turn produce their own counter-magnetic field which is detected by the metal detector's receiver.

In cases where the metal detector is being used to search for metal objects buried in the ground, the ground will often contain ferromagnetic minerals whose particles produce a decaying viscous remnant magnetic field. As the eddy currents in the metallic targets create a similarly decaying magnetic field, the two fields add together such that the coil used as a receiver for the detector has an induced emf that is the derivative of the two simultaneously decaying magnetic fields.

Needs exist for improved metal detectors.

SUMMARY OF THE INVENTION

This invention provides a pulse induction metal detector where a coil transmits a pulsed magnetic field to energize metal objects that are often buried or hidden in a matrix (ground) containing ferromagnetic minerals. A difficult challenge is to detect and identify the metal object while ignoring the ferromagnetic matrix. Techniques are presented for achieving this.

This invention describes a method of separating these two signals so that the adjustment of any detector function related to the metal target is independent of any adjustment to compensate, or minimize, the ferromagnetic matrix signal.

The primary applications of the invention are for gold nugget hunting in iron mineralized areas, or searching for relics, coins, jewelry etc. on inland sites, many of which have a degree of mineralization. Other applications include searching for coins, relics and jewelry on ocean beaches where the sand is derived from rock containing iron minerals, or on underwater shipwreck sites where the ballast stones are basalt or other iron mineralized rock. An example of an industrial application is where mineralized rock is processed and being fed on a conveyor into a crusher. A detector that can ignore the iron mineralization and detect metal objects such as drill bits, pry bars etc. will prevent damage to the machinery caused by ingesting these objects. The applications of the invention are not limited to the above and would also include mine and UXO detection.

These and further and other objects and features of the invention are apparent in the disclosure, which includes the above and ongoing written specification, with the claims and the drawings.

BRIEF DESCRIPTION OF THE DRAWINGS

FIG. 1 shows a traditional pulse induction coil drive.

FIGS. 2a-f show the responses of the traditional pulse induction coil drive.

FIG. 3 shows a constant current coil drive.

FIGS. 4a-f show the responses of the constant current coil drive.

FIGS. 7a and 7b show the constant current coil drive response for ferromagnetic particles.

FIG. 8a-c show bipolar operation with multiple proportional sampling.

DETAILED DESCRIPTION OF THE DRAWINGS

Figure 5A:
FIGS. 5a-f show proportional timing for a single variable pulse width.

This invention is a combination of three technologies:
1. Constant Current Transmitter Pulse
2. Proportional Pulse Generation
3. Dual sampling and Subtractive Ground Compensation These technologies are combined in the ways described in this invention.

Most prior art PI detectors utilize a simple scheme of energizing the search coil with a solid-state switch such as a MOSFET. FIG. 1 illustrates an example of using a PMOS transistor 103 to drive transmit coil 101 with a parallel resistance 102 with power from power supply 105. Timing circuit 106 provides the necessary control signal. In some forms transmit coil 101 also serves as the receive coil and is directly connected to the receiver circuitry 107. In other forms, a separate receive coil may be coupled to the receiver, either inductively balanced or not with the transmit coil.

FIG. 2a shows the control signal applied to PMOS transistor 103 from timing circuit 106. When the signal goes "low" (201) the PMOS switch turns "on" and provides a low impedance path for power supply 105 to energize the coil 101. Normally a battery serves as power supply 105. The series resistance of the PMOS switch plus other series resistances (e.g., the coil and the battery) create an exponential response 202 in the coil current waveform in FIG. 2b. The time constant of this response is $$\tau = \frac{L}{R_s}$$

L is the inductance of the coil, and $R_s$ is the total series parasitic resistance. The peak current level 203 is dictated by the parasitic resistances in the circuit.

FIG. 2c shows the voltage response of the coil. When the coil is energized, the voltage jumps up to a peak value 204 which is at or close to the power supply voltage. As the coil current increases exponentially 202, the coil voltage decreases with the same exponential response 205 toward a level also dictated by the parasitic resistances in the circuit.

When the PMOS switch is turned off 206 the current through the coil abruptly ceases 207 and creates a large transient flyback voltage 208 due to the voltage-current relationship of the inductor:

$$v(t) = L \cdot \frac{di(t)}{dt}$$

L is the inductance of the coil; di(t) is the coil current at turn-off, and dt is the speed at which the current is turned off. Ideally, the current transitions from its maximum value to zero. Because parasitic capacitances can cause undesired ringing the flyback response, the coil is normally damped with damping resistor 102. For critical damping the maximum peak voltage of the transient 209 is determined by the equation $$v(t) = \frac{I}{C} \cdot t \cdot e^{-t/\sqrt{LC}}$$

I is the peak current at turn-off and C is the total parasitic capacitance. Although it is possible for the peak of the flyback to reach many hundreds of volts, it is often limited by the breakdown voltage of the MOSFET to 200-400 volts.

The voltage 210 then decays at a rate determined by the coil inductance, parasitic capacitance, and damping resistor 102. Conductive targets in close proximity to the coil affect the decay of the flyback due to induced eddy currents. The effect depends on the both the coil charging characteristics and the characteristics of the target. As the coil is charging, eddy currents are induced in the target until the coil reaches a steady-state current 203, at which point the induced target eddy currents exponentially die out. Eddy currents tend to be circular in nature and the eddy current path has an associated inherent inductance L and resistance R so that the response is dominated by the target time constant L/R. Skin depth can play a strong role, and thin targets tend to have a lower time constant than thicker targets of identical metal composition.

The time constant of a metal target affects not only the induced eddy currents during the coil charge-time period but also the decaying eddy currents at coil turn-off. It is generally desirable for target eddy currents to substantially die out prior to coil turn-off because, owing to an opposite polarity, any residual charge-time eddy currents will subtract from the induced discharge (flyback) eddy currents and reduce target detection depth. That is, in a target with a fast time constant the induced eddy currents will quickly die out once the coil current has reached a steady-state level, whereas a target with a slow time constant will be slower to decay back to zero. This can be used to great effect in identifying target composition.

It is generally desirable for the charge-time coil current to reach a steady-state level as quickly as possible, but in the traditional PI transmit circuit (FIG. 1) this is limited by the tau (L/R$_s$) of the coil charging circuit. As the charge time pulse width 212 is reduced (FIG. 2*d*), the resulting charge current 213 is still rising at the point of turn-off. This results in a lower peak charge current which alters the flyback response 214 compared to a fully settled coil current 203 and also alters targets responses.

A preferable method is to charge the coil as quickly as possible using a constant current charging circuit, conceptually shown in FIG. 3 with response waveforms shown in FIG. 4*a* and FIG. 4*b*. When coil switch 303 is closed by the active low timing signal 401 from timing circuit 306, current source 304 will be applied to coil 301. This results in a coil current response 402 which reaches a near-instantaneous steady-state level 403.

Because of the intrinsic current-voltage relationship on an inductor, the near-instantaneous change in current results in a high flyback voltage 404 which quickly settles to a low voltage level 405. The high flyback voltage means that the current source 304 must be driven by a high voltage source 305. At the coil turn-off point 406, the resulting current and voltage responses (407, 408, 409, 410, 411) are similar to the turn-off responses (207, 208, 209, 210, 211) of the traditional PI circuit.

The comparative result of this method is illustrated in FIG. 4*e* and FIG. 4*f*. When the transmit charge time 412 is considerably shortened (FIG. 4*d*), the coil current will still reach the same steady-state value 413 as for longer charge times, as opposed to 213 where the charging tau limits the peak current for the shorter charge time. The voltage flyback response 414 will also be substantially the same as 410. Provisional patent application 61/403,598 describes a constant-current pulse induction (CCPI) technique whereby a high voltage applied at initial coil turn-on forces the coil current to quickly reach its steady-state level, at which point a low voltage is quickly switched in to hold the current to the steady-state level. This technique effectively implements the responses illustrated in FIG. 4.

Many metal detectors are designed to search for conductive targets in a ground matrix. The ground matrix often consists of ferric and ferromagnetic particles which also affect the decay of the flyback response. Ferric particles are purely reactive; their response dies out almost instantaneously and do not normally cause a problem for PI detectors. However, ferromagnetic responses have a much longer response that can superimpose with target eddy responses.

The signal that is generated by ferromagnetic minerals is caused by superparamagnetic (SPM) particles that are forced into alignment by the charge-time PI transmit field. When the transmit field is turned off, the forced alignment of these particles decays back to their relaxed states with approximately a 1/t response. While the charge-time alignment occurs relatively instantaneously, this "remnant" decay is normally in the 10's and 100's of microseconds (s) depending on the concentration of SPM particles and the strength of the steady-state magnetic field.

In prior art the ferromagnetic response has been dealt with by sampling the decay signal at two instances of time, 501 and 502. Additional gain is applied to the latter (secondary) sampled point 504 until its response to the 1/t decay of ferromagnetic response is identical to the early (primary) sampled point 503. The latter point 504 is subtracted from the early point 503 which cancels the ferromagnetic response. Eddy responses follow a different decay path and do not tend to cancel.

There are drawbacks to the method. First, while eddy responses do not follow a 1/t decay and should not cancel, by taking only two sample points it is possible for a particular eddy responses to coincide with the chosen sample points. That is, it is possible for some eddy targets to be unintentionally rejected. This can be resolved by taking more than two sample points to ensure that only 1/t decay responses are rejected. A second drawback is that the additional gain applied to the second sample point produces additional noise to that point and makes the subtractive response including ferromagnetic rejection somewhat noisier than the raw responses.

Another drawback is that the first sample point is often the same sample point used for the target response. The delay of this sample point is usually variable and the second sample point is taken at a fixed delay from the first sample point. The samples are usually applied to integration circuits and therefore the additional secondary gain needed to achieve ferromagnetic cancellation is sensitive to not only the spacing between the samples, but also the absolute position of the samples and the width of the samples. For example, variations in the delay of the initial sample point will usually defeat the subtractive cancellation unless the secondary gain is adjusted to restore the balance point.

Figure 5B:
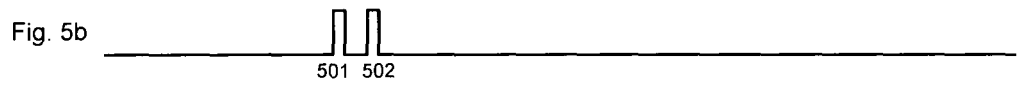
Figure 5C:
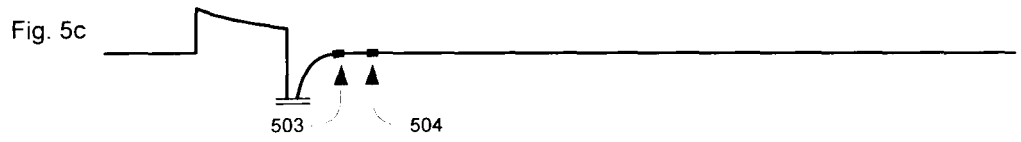
Figure 5D:
Figure 5E:
Figure 5F:

This last shortcoming can be addressed by using proportional timing whereby variations in the pulse rate frequency are matched by proportional changes in the primary sample delay, sample width, transmit charge time, and spacings between primary and secondary sample points. This ensures that the integration and subtraction stay consistent throughout the range of clock frequencies. FIGS. 5a and 5b illustrate a particular transmit pulse width and sample timing, respectively. A resulting example of a transmit waveform is shown in FIG. 5c with the sampled regions highlighted (the flyback peak is attenuated). FIGS. 5d and 5e illustrate proportionally increased timings (all doubled in this example), with a resulting transmit waveform shown in FIG. 5f.

Figure 6A:
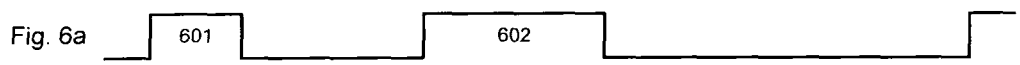
FIGS. 6a-c show proportional timing for dual sequential pulse widths.
Figure 6B:
Figure 6C:
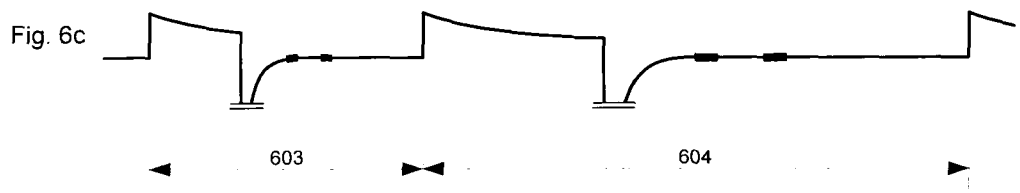

Proportionally adjusted timing not only has the ability to hold the ferromagnetic cancellation versus variations in the sample delay, but it also can produce different responses for conductive targets as the timing is varied, thereby offering the simultaneous ability to eliminate the unintentional rejection of conductive targets that coincide with a particular ferromagnetic cancellation timing, and also the ability to better identify target composition. FIG. 6a illustrates the sequential transmission of two different charge times 601 and 602, FIG. 6b shows the proportionally spaced sample points, and FIG. 6c shows the resulting transmit waveform with the sample points highlighted. Each charge time is shown with a proportionally spaced overall period 603 and 604, though it is possible to attenuate the longer turn-off times. This concept can be extended to three or more charge times and any number of sampled points.

With a CCPI transmit circuitry the remnant ferromagnetic decay will be substantially the same regardless of the length of the transmit charge time, providing the same steady-state current level is attained. FIG. 7 illustrates a ferromagnetic response 703 after a short duration CCPI transmit charge time 701 and a ferromagnetic response 704 after a short duration CCPI transmit charge time 702. Subtracting the short duration response from the long duration response will effectively nullify the ferromagnetic response.

Target eddy responses are typically sensitive to the transmit charge time even if the same steady-state current level is always achieved. A target with a fast tau of 1 or 2 s (such as a very small gold nugget, or a bit of aluminum foil) may have similar responses to a 5 s and a 100 s charge time, but a target with a tau of 20 s will have substantially different responses to the same charge times. Therefore, pulse width-based subtractive nulling is effective for removing ferromagnetic responses while maintaining target responses. This concept can be extended to additional long charge times whereby a single short-pulse ferromagnetic response is subtracted from a plurality of different long-pulse responses. It may be necessary to scale the short-pulse response for proper nulling, and this scaling can be done either manually by a user control or automatically using a ground tracking circuit.

Relatively static magnetic fields, including the Earth's magnetic field and permanently magnetized soils, can caused induced receive responses in PI metal detectors. In traditional PI detectors, this is usually dealt with by taking a very late sample and directly subtracting its response from the early sample response. Induced magnetic offsets will tend to cancel, but the very late sample will have almost no target signal component and therefore has minimal effect on overall target response. A better method is to use bipolar pulsing where a given charge time pulse width is transmitted twice but with opposite polarities. Subtracting the two responses will cancel induced magnetic offsets but because target responses are of opposite polarities they are additive.

Traditional PI detectors have largely been designed with analog receive signal processing which has limited the number of sample points for analysis due to circuit complexity. Digital signal processing (DSP) expands the capability of processing multiple sample points by moving the complexity of the analog circuitry into software. An analog-to-digital converter may be used to sample the received signal at any desired location. If a separate receive coil is used, particularly when induction-balanced with the transmit coil, the received signal can be sampled even during the transmit charge time where reactive targets are easier to distinguish. FIG. 8a shows the transmit timing for a bipolar transmit waveform of two different charge times. FIG. 8b shows the sample points for two turn-on time samples 801 and four turn-off time samples 802, proportionally spaced. FIG. 8c shows the resulting transmit waveform with the corresponding sample points highlighted.

In the context of this patent, it is understood that the term "circuit," especially as it applies to signal processing, may refer to either an analog circuit which processes signals as voltages and/or currents, or a digital circuit, in particular a microprocessor or microcontroller, which may be preceded by an analog-to-digital converter to digitize the analog signals, and achieves signal processing in software, or a combination of analog and digital signal processing. The invention may be realized any number of ways that are apparent to one skilled in the arts, and the use of particular methods in the description of this invention is not intended to be limiting.

While the invention has been described with reference to specific embodiments, modifications and variations of the invention may be constructed without departing from the scope of the invention, which is defined in the following claims.

We claim:

1. A metal detector comprising
    (a) a transmit coil for producing a periodic transmitted magnetic field in response to an applied periodic transmit current, in which each period is comprised of one or more transmit current turn-on charge times, each of which is followed by a turn-off time in which no current is applied;
    (b) a transmit circuit for creating the transmit current comprising a high voltage source and a low voltage source, whereby the high voltage source is switched in during the turn-on charge time of the transmit coil to effect a substantially instantaneous transition to a desired current, then the low voltage source is switched in to maintain the desired current at a substantially steady-state value;
    (c) a receive circuit capable of sampling the received signal created from the transmitted magnetic field and its effect on a surrounding matrix and conductive targets, and processing the one or more samples.

2. The metal detector of claim 1 in which the transmit circuit produces a repeating plurality of charge time pulse widths, all of which achieve substantially identical steady-state currents, each followed by a turn-off time.

3. The metal detector of claim 2 in which one or more of the charge time pulse widths is substantially short, less than 5 us, such that ferromagnetic particles are effectively charged but most conductive targets are not.

4. The metal detector of claim 3 in which the one or more received signal samples from a short pulse are subtracted from the one or more received signal samples from one or more longer pulses to substantially nullify the remanence response of ferromagnetic particles.

5. The metal detector of claim 4 in which the one or more short pulse response samples are scaled prior to the subtraction to improve the quality of the ferromagnetic null.

6. The metal detector of claim 5 in which the scaling of the one or more short pulse response samples are determined automatically by a ground tracking circuit.

7. The metal detector of claim 2 in which the receive circuit processes a plurality of sample points during the plurality of coil turn-off times, where the sample points for each turn-off time are proportionally spaced according to the immediately preceding charge time pulse width.

8. The metal detector of claim 7 in which the plurality of sample points from one turn-off time are compared to the sample points in a second turn-off time to determine likely target composition.

9. The metal detector of claim 2 in which the receive circuit processes a plurality of sample points during the plurality of coil charge times, where the sample points in each charge time are proportionally spaced according to the charge time pulse width.

10. The metal detector of claim 9 in which the plurality of sample points from one charge time are compared to the sample points in a second charge time to determine likely target composition.

11. The metal detector of claim 2 in which each charge time pulse width is comprised of two charge times, a first charge time and a second charge time, whereby the second charge time current has substantially the same magnitude but opposite polarity of the first charge time current.

12. The metal detector of claim 11 in which the received responses for the opposite polarities of each give charge time pulse width are combined to cancel undesirable induced signals from static magnetic fields and noise sources while maintaining desired induced target signals.

13. A metal detector method comprising
providing a transmit circuit;
creating a transmit current having a high voltage source and a low voltage source;
a transmit coil;
producing a periodic transmitted magnetic field in response to an applied periodic transmit current, in which each period is comprised of one or more transmit current turn-on charge times, each of which is followed by a turn-off time in which no current is applied;
switching in the high voltage source to the transmit coil during a turn-on charge time of the transmit coil;
effecting a substantially instantaneous transition to a desired current in the transmit coil;
switching in the low voltage source to the transmit coil to maintain the desired current at a substantially steady-state value;
providing a receive circuit;
sampling received signals created from the transmitted magnetic field and an effect of the transmitted magnetic field on a surrounding matrix and conductive targets, and processing the sampled received signals.

14. The metal detector method of claim 13 further comprising the transmit circuit producing a repeating plurality of charge time pulse widths, all of which achieve substantially identical steady-state currents, each followed by a turn-off time.

15. The metal detector method of claim 14 further comprising providing substantially short charge time pulse widths less than 5 µs, such that ferromagnetic particles are effectively charged but most conductive targets are not.

16. The metal detector method of claim 15 further comprising subtracting the one or more received signal samples from a short pulse from the one or more received signal samples from one or more longer pulses and substantially nullifying the remanence response of ferromagnetic particles.

17. The metal detector method of claim 16 further comprising scaling one or more short pulse response samples prior to subtracting and improving quality of a ferromagnetic null.

18. The metal detector method of claim 17 further comprising providing a ground tracking circuit and response samples are automatically determining with the ground tracking circuit.

19. The metal detector method of claim 14 further comprising processing a plurality of sample points during the plurality of coil turn-off times in the receive circuit, and proportionally spacing the sample points for each turn-off time according to an immediately preceding charge time pulse width.

20. The metal detector method of claim 19 further comprising comparing the plurality of sample points from one turn-off time to the sample points in a second turn-off time and determining likely target composition.

21. The metal detector method of claim 14 further comprising processing a plurality of sample points in the receive circuit during the plurality of coil charge times, and proportionally spacing the sample points in each charge time according to charge time of each pulse width.

22. The metal detector method of claim 21 further comprising comparing a plurality of sample points from one charge time to sample points in a second charge time and determining likely target composition.

23. The metal detector method of claim 14 in which each charge time pulse width is comprised of two charge times, a first charge time and a second charge time, whereby the second charge time current has substantially the same magnitude but opposite polarity of the first charge time current.

24. The metal detector method of claim 23 further comprising combining received responses for opposite polarities of each given charge time pulse width and cancelling undesirable induced signals from static magnetic fields and noise sources while maintaining desired induced target signals.

\* \* \* \* \*